Figure 1:
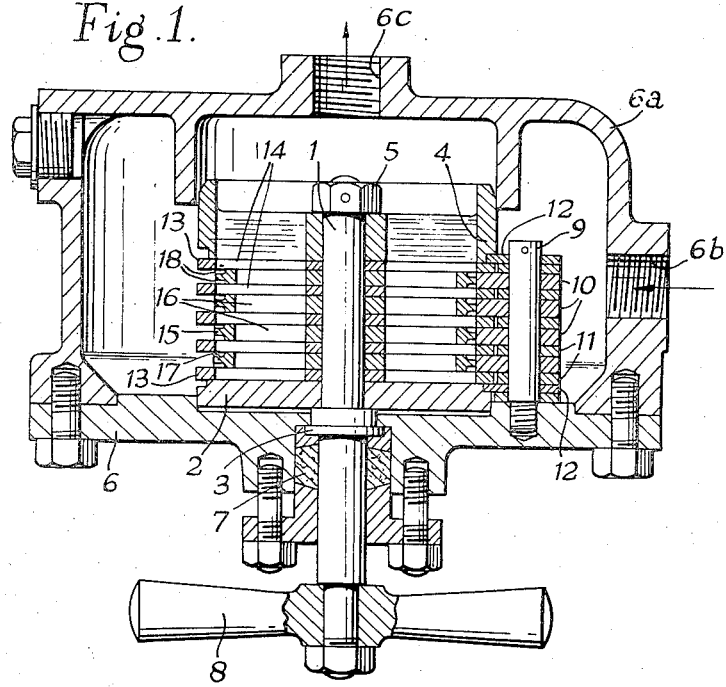

Oct. 7, 1958 — L. W. ENGLISH — 2,855,106
STRAINING OR FILTERING APPARATUS FOR LIQUIDS
Filed May 11, 1954 — 3 Sheets-Sheet 1

INVENTOR
Leonard Walter English
BY
KARL W. FLOCKS
ATTORNEY

Oct. 7, 1958   L. W. ENGLISH   2,855,106
STRAINING OR FILTERING APPARATUS FOR LIQUIDS
Filed May 11, 1954   3 Sheets-Sheet 2

INVENTOR
Leonard Walter English
BY
Karl W. Flocks
ATTORNEY

Oct. 7, 1958   L. W. ENGLISH   2,855,106
STRAINING OR FILTERING APPARATUS FOR LIQUIDS
Filed May 11, 1954   3 Sheets-Sheet 3
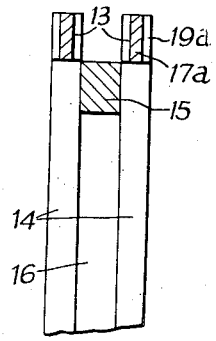
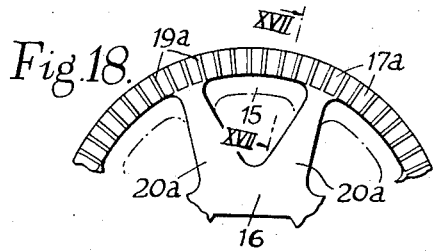
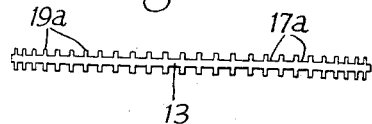
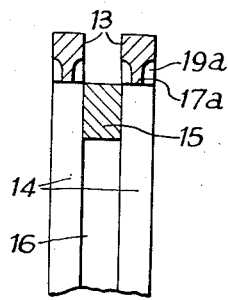
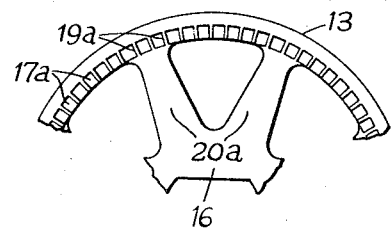
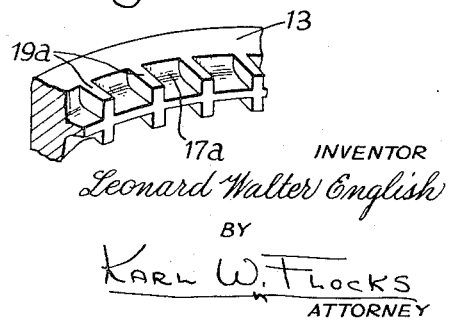
INVENTOR
Leonard Walter English
BY
Karl W. Flocks
ATTORNEY

United States Patent Office 2,855,106
Patented Oct. 7, 1958

2,855,106
STRAINING OR FILTERING APPARATUS FOR LIQUIDS

Leonard Walter English, Hounslow, England, assignor to Auto-Klean Strainers Limited, Hounslow, England, a British company Application May 11, 1954, Serial No. 429,041

Claims priority, application Great Britain May 11, 1953

2 Claims. (Cl. 210—492)

This invention relates to straining or filtering apparatus, for liquids, of the type (hereinafter referred to as "the type specified") in which the liquid has a straight-through flow through fine slots formed between the inner and outer edges of a series of parallel, coaxial, frame-like filter elements, of similar shape, adjacent elements being of different sizes and similarly disposed with respect of each other.

Apparatus of the type specified, in which the outer edge of one filter element has substantially the same dimensions as the inner edge of the adjacent filter element from which it is spaced axially, usually by means of separate spacers, so that these edges define filtering slots having no appreciable length in the direction of flow of the liquid, was described and claimed in the specification of United States Patent No. 2,453,622.

When it is required to construct straining or filtering apparatus of the type specified so that it will be suitable for filtering out fine particles from liquid, difficulties are encountered in producing and handling the spacers which are to be employed for spacing apart the adjacent frame-like filter elements in order to define filter slots of the appropriate small width. Additionally, the fact that each of these slots has relatively considerable length results in a necessity to reduce the width of the slots to somewhat less than the mesh size of a filtering gauze which would be effective in arresting particles of the degree of fineness concerned.

The object of the present invention is to provide improvements in apparatus of the type specified whereby these disadvantages may be satisfactorily overcome.

According to the invention there is provided filtering apparatus of the type specified in which axial spacing between the outer edge of one filter element and the inner edge of the adjacent filter element is produced by reducing the thickness of the rim or frame-like portion of at least one of these elements at the appropriate outer or inner margin of the rim or frame-like portion and placing the filter elements in direct contact with each other.

Preferably the outer edge of one filter element has substantially the same dimensions as the inner edge of the adjacent filter element so that these edges define filtering slots having no appreciable length in the direction of the liquid.

The necessary reduction in thickness may be produced by coining the filter elements at the appropriate location or by means of engraving, moulding or like operations effected during the production of the elements. Preferably the reduction in thickness is effected upon only one of the two adjacent elements so as to be equivalent to the width of filtering slot required. However, in some cases both of the adjacent elements may be reduced in thickness at the appropriate edges so that the sum of the two reductions is equivalent to the width of the filter slot required.

The reduction in thickness of the rim or frame-like portion of a filter element may be effected over part or the whole of the width and over the full length of the rim or frame-like portion in which case the filter slots will extent for the full length of the periphery of the element or it may be effected over part or the whole of the width but over relatively short spaced portions of the length of the rim or frame-like portion in which case the filter slots are broken up into a relatively large number of short slot portions.

Figure 2:
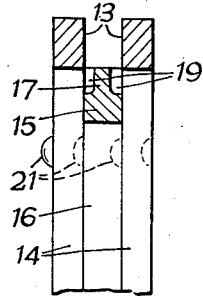
Figure 3:
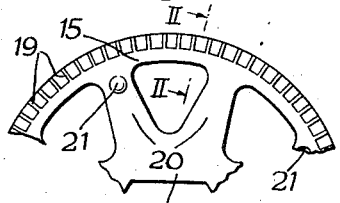
Figure 4:
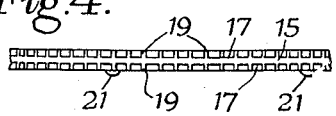
Figure 9:
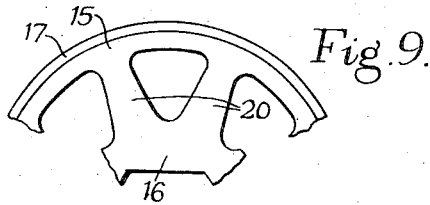
Figure 10:
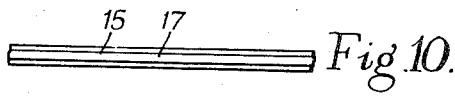
Figure 11:
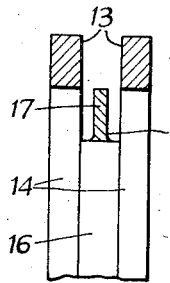
Figure 12:
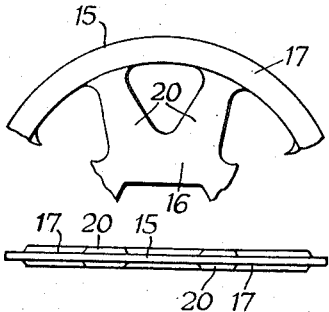
Figure 13:
Figure 14:
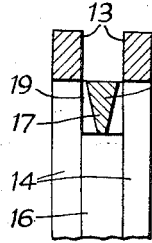
Figure 15:
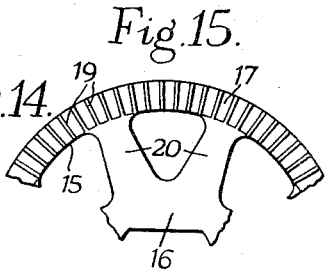
Figure 16:
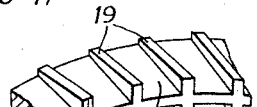

Some examples of the way in which the present invention may be employed to modify a straining or filtering apparatus according to United States Patent No. 2,453,622 will now be described in detail with reference to the accompanying drawings, in which:

Fig. 1 is an axial section through one form of strainer,

Figs. 2 to 4 show details of the filtering elements incorporated in the strainer of Fig. 1, Fig. 2 being a fragmentary view of part of three adjacent discs on the line II—II of Fig. 3, Fig. 3 being a plan view of part of one of the discs of smaller diameter and Fig. 4 being a side elevation of the disc of Fig. 3, Figs. 5 to 7 show in views similar to those of Figs. 2 to 4, details of a modified filter element which can be incorporated in the strainer of Fig. 1, Figs. 8 to 10 show, in views similar to those of Figs. 2 to 4, yet another modified filter element, Figs. 11 to 13 show, in views similar to those of Figs. 2 to 4, a further modified filter element, Figs. 14 to 16 show yet another modified form of filter disc, Figs. 14 and 15 being views respectively similar to those shown in Figs. 2 and 3 but Fig. 16 being a fragmentary perspective view of part of the rim of a filter disc of smaller size, Figs. 17 to 19 show yet another modification in which the larger discs are coined, Fig. 17 being a fragmentary view of part of three adjacent discs on the line III—III of Fig. 18, Fig. 18 being a plan view of part of one of the discs of larger diameter and Fig. 19 being a side elevation of the disc of Fig. 18, and Figs. 20 to 22 show a modification of the discs shown in Figs. 17 to 19, Figs. 20 and 21 respectively being views corresponding with those shown in Figs. 17 and 18 and Fig. 22 being a fragmentary perspective view of part of the disc shown in Fig. 21.

In all these figures, like parts are indicated by the same reference numerals and only so much of the various forms is illustrated as is essential to a full understanding of the invention. Fig. 1 is an example only of one method of building up a complete strainer or filter embodying the characteristic features of this invention and it is thought that those skilled in the art will readily be able to modify such an arrangement to suit the various embodiments herein described without further illustration of specific means which in themselves form no part of the invention.

As shown in Fig. 1, a substantially cylindrical straining wall is composed of the rim portions of alternate wheel-like discs of larger and smaller diameter all non-rotatably secured on a suitably flatted central spindle 1 through the intermediary of an end-plate 2 which abuts against an enlarged portion 3 of the spindle and a wheel-shaped end-member 4 engaged by a nut 5 screwed on the inner end of the spindle 1. The spindle 1 is rotatably mounted in a plate 6 through which it passes by way of a packed gland 7, the outer end of the spindle being furnished with a handle 8. By means of the plate 6, the strainer is mounted, in this example, in a suitable vessel 6a by way of an inlet 6b through which the liquid to be strained has access to the exterior of the straining wall where it is strained in entering the chamber enclosed by the said wall through the annular spaces between the discs. The filtered or strained liquid passes out of the vessel 6a through the outlet 6b. Mounted in the plate 6, to one side of the straining wall and outside the same in this example, is a post 9 supporting a series of scrapers or cleaning blades 10 alternating with spacing washers 11 and clamped between end-pieces 12 engaged by annular shoulders on the parts 2 and 4. When necessary, cleaning of the strainer is effected in known manner by turning the straining wall, by means of the handle 8, in relation to the stationary cleaning blades 10. A further set of the latter may be arranged on a duplicate post located diametrically opposite to the post 9, the blades 10 then being alternated on the posts so that no two blades which serve to clear adjacent pairs of filtering slots between the elements constituting the straining wall are mounted upon the same post. This cancels out any heavy side thrusts which may tend to be produced, as is known from United States Patent No. 2,453,622.

The present invention is concerned with the constitution and arrangement of the straining wall.

In the example of Fig. 1, the straining wall is composed of rim-portions 13 of larger diameter wheel-like discs 14 alternated with rim portions 15 of smaller diameter wheel-like discs 16, the discs 14 and 16 being mounted directly in contact with one another. The rim portions 13 of the larger discs 14 have an internal diameter equal to the external diameter of the rim portions 15 of the smaller discs 16 which are reduced in thickness as at 17 adjacent their periphery so that filtering slots 18 are defined by the inner edges of the larger discs and the outer edges of the reduced thickness portions 17 of the adjacent smaller discs.

The arrangement of the straining wall is shown more clearly in Fig. 2 of the drawings which shows a fragmentary section through part of three adjacent discs. It will be seen from Fig. 2 and from Figs. 3 and 4 that the rim portion 15 of the smaller diameter disc 16 is formed with portions of reduced thickness 17 which are separated by radially extending walls 19, the portions 17 extending only partly across the rim 15 in the radial direction thereof. Thus the filtering slots provided between the outer edges of the rims 15 and the inner edges of the rims 13 are broken up into a number of portions each of the correct predetermined width but of relatively short length.

The wheel-like discs 14 and 16 are each formed with spokes, such as 20, which are formed with dimples or depressions 21. The dimples or depressions 21 are formed in the spokes by pressing so as to constitute a corresponding raised portion on the face of the spoke opposite from the dimple or depression. As shown in Fig. 2 each of the dimples on one disc interengage with one of the raised portions on an adjacent disc when these are assembled together. The provision of such dimples or depressions 21 is desirable since owing to the limits of manufacturing accuracy it is not always possible to ensure that adjacent discs can be assembled on the flattened central spindle 1 of the strainer with their peripheries in the required relative positions. The interengagement of the dimples or depressions 21 with the corresponding raised portions ensures that each disc is correctly positioned relative to its adjacent discs.

Figure 5:
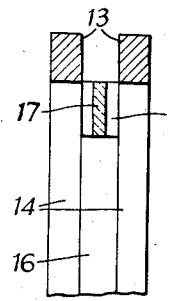
Figure 6:
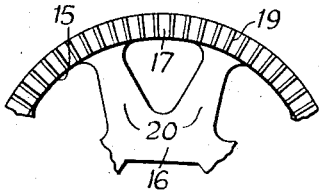
Figure 7:
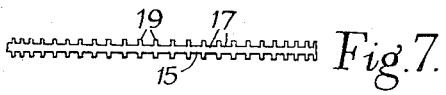

Figs. 5 to 7 inclusive show a modified arrangement of discs differing only from those shown in Figs. 2 to 4 in that the portions 17 of reduced thickness extend completely across the rim 15 of the disc 16.

Figure 8:
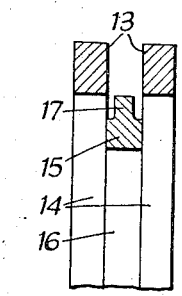

Figs. 8 to 10 inclusive show another modification of the discs 16 differing only from that shown in Figs. 2 to 4 in that the radially extending walls 19 are omitted so that the portions 17 of reduced thickness extend continuously around the periphery of the rim 15.

Figs. 11 to 13 inclusive show yet another modification of the disc 16 which differs only from that shown in Figs. 5 to 7 inclusive in that the radially extending walls 19 are omitted so that the portions 17 of reduced thickness extend continuously around the periphery of the rim 15.

Figs. 14 to 16 inclusive show a further modification of the disc 16 which differs from that shown in Figs. 5 to 7 inclusive only in that the reduction in thickness of the portions 17 is greater at the inner edge of the rim 15 than at its outer periphery. It will be apparent that if desired the portions 17 could be arranged to extend only partly across the rim 15 and the walls 19 could be omitted to provide a single continuous filtering slot of a length equal to the circumference of the disc 16.

Although coining of the smaller disc 16 has so far been described it will be obvious that the reduction in thickness could be effected at the inner edge of the larger discs 14. Figs. 17 to 19 inclusive of the drawings show one form of disc 14 which may be used. In this case the rims 13 are formed with portions 17a of reduced thickness, these portions extending radially completely across the rim 13 and being separated by walls 19a.

In a modification shown in Figs. 20 to 22 inclusive the portions 17a of reduced thickness extend only partially across the rim 13 in the radial direction.

It will be apparent that as in the case of the discs 16, the discs 14 shown in Figs. 17 to 22 inclusive could be formed without the walls 19a to provide a single complete filtering slot extending around the whole of the inner periphery of the rims 13 of the discs 14.

In all the modifications shown in the drawings portions 17 or 17a of reduced thickness have been formed either on the discs 16 or the discs 14 but it will be apparent that both sets of discs could be formed with such portions. In this case the width of the filtering slots obtained when the discs are assembled will be equal to the combined depths of such portions on adjacent discs. The provision of dimples, such as 21, shown in connection with Figs. 2 to 4 of the drawings is particularly important in this case where the slots are divided by walls 19 and 19a in order that these walls, on adjacent discs, coincide.

The scrapers 10 are in the form of blades extending between the adjacent larger discs 14 to bear on the outer edges of the smaller discs 16 comprised between them and are mounted, as described, on the post 9. As has been mentioned, relative motion may be produced between the straining wall and the scrapers, when desired, in order to effect cleaning of the filtering slots 18 in known manner.

It will be appreciated that with all the arrangements described filtering slots, whether continuous or interrupted, of very small width may be produced without its being necessary to utilise spacers of an equivalent very small thickness.

What I claim is:

1. In filtering apparatus for liquids, a plurality of coaxial spider-like filter elements, said filter elements including a plurality of discs, each of which is formed with a solid rim portion on the periphery thereof, the upper and lower surfaces of said rim portions being flat and free of surface impressions, spacer elements interposed between said discs having a shape similar thereto and located in engaging relation therewith, each of said spacer elements having a rim portion formed thereon, the diameter of the outer periphery of which is substantially equal to the diameter of the inner periphery of the rim portions of said discs, said spacer element rim portions being grooved at intervals along the upper and lower surfaces thereof, and a plurality of filter slots defined by the inner edges of said disc rim portions, the outer edges of the rim portions of said spacer elements and the grooves formed in said spacer elements, said grooves providing access for the filtered liquid to the interior of said frame-like filter elements.

2. In filtering apparatus for liquids as set forth in claim 1, wherein the upper and lower spacer element grooves extend in a radial direction the length of said spacer element rim portions, said grooves thereby being defined by a plurality of radially extending walls.

References Cited in the file of this patent

UNITED STATES PATENTS

| | | |
|---|---|---|
| 1,926,557 | Perkins | Sept. 12, 1933 |
| 1,976,547 | Dumas | Oct. 9, 1934 |
| 2,453,622 | English | Nov. 9, 1948 |
| 2,601,521 | Heftler | June 24, 1952 |

FOREIGN PATENTS

| | | |
|---|---|---|
| 486,397 | Great Britain | June 2, 1938 |